(12) United States Patent
Pollakowski et al.

(10) Patent No.: US 8,918,491 B2
(45) Date of Patent: Dec. 23, 2014

(54) USE OF AN IDENTIFICATION INFORMATION IN A NETWORK MANAGEMENT

(75) Inventors: Olaf Pollakowski, Berlin (DE); Thomas Ulrich, Bad Dürkhelm (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 988 days.

(21) Appl. No.: 12/223,165

(22) PCT Filed: Dec. 15, 2006

(86) PCT No.: PCT/EP2006/069757
§ 371 (c)(1),
(2), (4) Date: Jul. 28, 2010

(87) PCT Pub. No.: WO2007/087934
PCT Pub. Date: Aug. 9, 2007

(65) Prior Publication Data
US 2010/0293260 A1        Nov. 18, 2010

(30) Foreign Application Priority Data
Jan. 24, 2006    (DE) .......................... 10 2006 003 391

(51) Int. Cl.
*G06F 15/173* (2006.01)
*H04Q 3/00* (2006.01)
*H04L 12/24* (2006.01)

(52) U.S. Cl.
CPC .............. *H04Q 3/0062* (2013.01); *H04L 12/24* (2013.01); *H04L 41/00* (2013.01); *H04L 41/0206* (2013.01); *H04L 41/046* (2013.01)

USPC ........... 709/223; 709/204; 709/205; 709/206; 709/207; 709/212; 709/213; 709/214; 709/215; 709/216

(58) Field of Classification Search
USPC .......... 709/204–207, 212–216, 223; 707/611, 707/621
See application file for complete search history.

(56) References Cited

U.S. PATENT DOCUMENTS 6,330,618 B1 * 12/2001 Hawkins et al. .............. 709/248
6,393,434 B1 *  5/2002 Huang et al. .................... 1/1
6,470,329 B1 * 10/2002 Livschitz ....................... 1/1
7,346,705 B2 *  3/2008 Hullot et al. ................. 709/238
(Continued)

FOREIGN PATENT DOCUMENTS

DE       103 37 450       12/2004
EP       0 772 319         5/1997
WO       2006/010703      2/2006

*Primary Examiner* — Phuoc Nguyen
*Assistant Examiner* — Clarence John
(74) *Attorney, Agent, or Firm* — Squire Patton Boggs (US) LLP

(57) ABSTRACT

A method for the operation of network management systems, according to which values of attributes relating to an element are presented to a first manager and values of attributes relating to an element, which correspond to the values of the first manager, are presented to a second manager. The first and second manager determine the same identification information according to the same rule and using at least some of the values as well as store said identification information independently from a modification of the values of attributes relating to the respective element. The identification information is used during communication between the first manager and the second manager for identifying the element.

18 Claims, 1 Drawing Sheet

(56) References Cited

U.S. PATENT DOCUMENTS

| | | | |
|---|---|---|---|
| 8,201,221 B2* | 6/2012 | Kitani et al. | 726/4 |
| 2001/0019559 A1* | 9/2001 | Handler et al. | 370/468 |
| 2002/0029298 A1* | 3/2002 | Wilson | 709/316 |
| 2002/0059299 A1* | 5/2002 | Spaey | 707/104.1 |
| 2002/0133508 A1* | 9/2002 | LaRue et al. | 707/202 |
| 2003/0092443 A1* | 5/2003 | Hiyama et al. | 455/435 |
| 2003/0182327 A1* | 9/2003 | Ramanujam et al. | 707/204 |
| 2004/0254985 A1* | 12/2004 | Horstemeyer | 709/205 |
| 2005/0228812 A1* | 10/2005 | Hansmann et al. | 707/102 |
| 2007/0078959 A1* | 4/2007 | Ye | 709/223 |
| 2010/0293260 A1* | 11/2010 | Pollakowski et al. | 709/223 |

\* cited by examiner

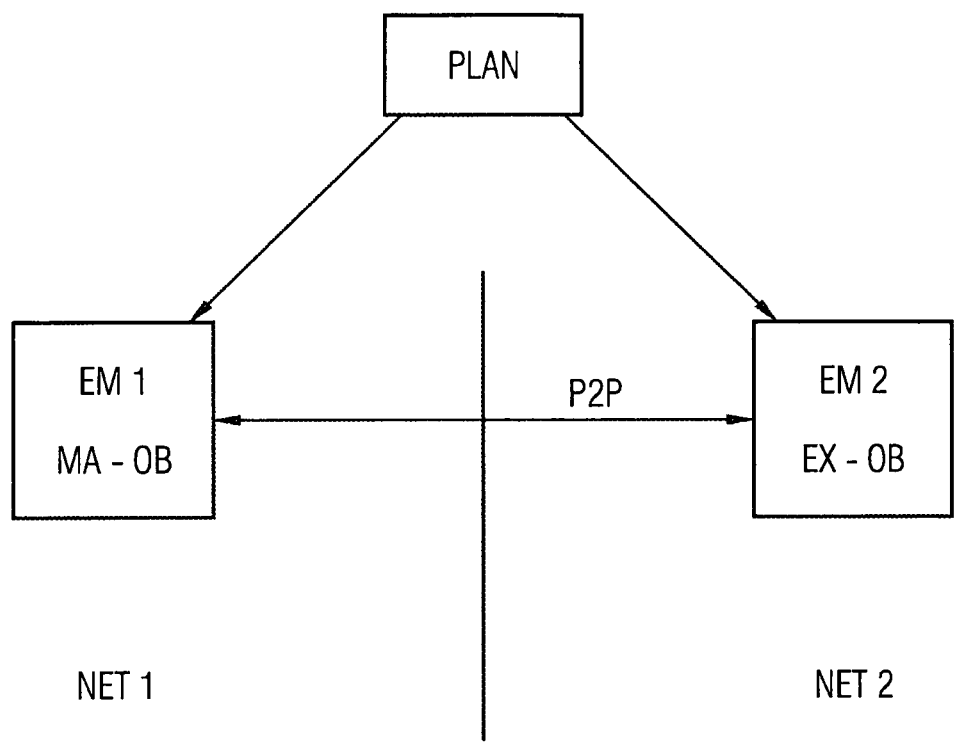

USE OF AN IDENTIFICATION INFORMATION IN A NETWORK MANAGEMENT

CROSS REFERENCE TO RELATED APPLICATIONS

This application is based on and hereby claims priority to German Application No. 10 2006 003 391.4 filed on Jan. 24, 2006 and PCT Application No. PCT/EP2006/069757 filed on Dec. 15, 2006, the contents of which are hereby incorporated by reference.

BACKGROUND OF THE INVENTION

The invention relates to a method for the operation of network management systems, wherein the same values of attributes relating to an object are presented to a first and a second manager.

In accordance with the principles of a management network, also referred to as TMN principles (TMN: Telecommunications Management Network), a plurality of management layers exist for the management of a communication system—such as, for example, of a mobile radio communication system—wherein a layer with the exception of the topmost and bottommost layer can have a double function, namely a manager function and an agent function. In the managing system, every level apart from the bottommost level performs a manager function for the underlying level. In the managed system, every level apart from the topmost level is accorded an agent function for the next higher layer.

Managers start operations for network monitoring and control by sending so-called "requests", which are performed by agents, and receive corresponding so-called "responses" from the agents. Elements of the telecommunications network, also referred to as resources of the telecommunications network, which perform the role of an agent in a TMN hierarchy detect relevant so-called "events", such as e.g. alarms, generate corresponding so-called "notifications" and transmit them in the form of so-called "event reports" to managers in order to enable efficient network management.

The network management can comprise, inter alia, fault management and/or configuration management and/or security management and/or accounting management and/or performance management. The network management is intended to provide suitable mechanisms for information distribution and management, such that a comprehensive picture of the state of the network is available as necessary and the individual elements of the telecommunications network can be efficiently monitored and configured.

The manager-agent communication takes place via so-called management interfaces or manager-agent interfaces which are characterized in an object-oriented environment by a communication protocol, such as e.g. CMIP (Common Management Information Protocol) according to ITU-T X.711 or CORBA (Common Object Request Broker Architecture) and by an object model. Object models serve for modeling resources of the telecommunications network, said resources are classified in object classes during the modeling.

Such interfaces exist for example between the network element management level, on the one hand, and the network element level, on the other hand. An example of network devices in this manager-agent interface is the operation and maintenance centers (OMC: Operation and Maintenance Center) on the part of the network element management level, and on the part of the network element level devices such as e.g. base stations of the base station system (BSS: Base Station System) of a GSM mobile radio network, or base stations of other communications networks, for example node B's of a UMTS mobile radio network (UMTS: Universal Mobile Telecommunication System) or radio access points of a WLAN system (WLAN: Wireless Local Area Network) for example in accordance with one of the IEEE 802.11 standards.

Management interfaces or manager-agent interfaces also exist between the network management level, on the one hand, and the network element management level, on the other hand. One example of network devices for this manager-agent interface is the network management centers (NMC: Network Management Center) on the part of the network management level and the operation and maintenance centers (OMC: Operation and Maintenance Center) on the part of the network element management level e.g. in said GSM or some other mobile radio or telecommunications network.

SUMMARY OF THE INVENTION

One potential object relates to demonstrating an efficient method for the operation of network management systems.

The inventors propose a method for the operation of network management systems, values of attributes relating to an element are presented to a first manager. Values of attributes relating to the element, which correspond to the values presented to the first manager, are presented to a second manager. The first and the second manager determine the same identification information items according to the same specification using at least some of the values; furthermore, they store the identification information items independently of a change in values of attributes relating to the element. The identification information items are used during a communication between the first manager and the second manager for identifying the element.

The managers manage or monitor elements, wherein the abovementioned element can be managed by the first and/or by the second manager, or else by neither of the two managers. The same values of attributes which relate to the element are presented to the two managers. In this case, an attribute which has a specific information content can be designated differently by the two managers and, if appropriate, also be arranged at a different position in the respective object tree. By way of example, an attribute which indicates an extent could be designated by "Fläche" by the first manager and by "Area" by the second manager, wherein the value of this extent presented to the two managers is the same.

The values for the attributes relating to the element which are presented in corresponding fashion to the two managers are communicated to the two managers preferably by the same device. These values can be e.g. the values which are presented upon generation of the object representing the element in or for the two managers, or the values which are presented to one manager at a specific point in time and are presented to the other manager, for which the object is generated later, upon generation of the object representing the element. It is possible for corresponding values to be simultaneously presented to the two managers or else for no values for the attributes to be presented to one of the two managers, while said values are presented to the other manager, wherein said values are presented to the first-mentioned manager later, or else for said values to be presented to one manager, while other values are presented to another manager, wherein, in the latter case, said values were presented to the second-mentioned manager previously or are presented to that manager later:

Using two or more of the values, the managers determine identification information items. Since this determination is placed on the same basis—the same values are used—and the same specification is used for the determination, the identification information items determined by the first manager are the same as those determined by the second manager. The determination of the identification information items by the two managers can be effected simultaneously or at different points in time; it is important for the result to be the same.

The two managers store the identification information items determined. This storage is effected independently of a change in values of attributes relating to the element. That is to say that in the case where a value of an attribute changes, the identification information items remain stored unchanged and are not changed or overwritten when the attribute values are overwritten by new values. This holds true at least as long as the identification information items are used for identifying the element between the first and the second manager. If this is no longer the case at a later point in time, the identification information items can be erased.

The identification information items are used for identifying the element. This means that one of the two managers understands a reference to the element if the respective other manager mentions the identification information items.

The method can be applied to more than two managers. In other words, alongside the first manager a plurality of managers may be present which carry out the steps described with regard to the second manager.

In a development of the proposed method, the identification information items determined comprise a single variable. This can be realized e.g. by calculating a hash function of some or all of the values, or by linking together all or some of the values in a specific order.

In accordance with another development of the proposed method, a combination of values of attributes is determined as identification information items. In a simple case, the values of all or some of the attributes can be stored as identification information items. In this case, the identification information items are not a single variable, but rather a plurality of values. In order to check for identity, an interrogation of a plurality of variables has to be effected in this case.

It is particularly advantageous if the communication between the first manager and the second manager involves a synchronization of values of attributes relating to the element. In this case, the identification information items are used for a data alignment.

In one configuration, the first manager determines further identification information items and conveys them to the second manager in the context of the communication. The further identification information items are used during a further communication between the first and the second manager for identifying the element. The identification information items determined on the basis of the same values are therefore used at least once; afterward, it is possible to use the further identification information items, which are not determined by both managers but rather only by the first manager.

It is advantageous if the first manager functions as a manager with respect to the element, while the second manager functions as a manager exclusively with respect to other elements. In this case, the first and the second manager are in a different relationship with the element: for the first manager it is an element that it manages, and for the second manager it is only an element about which this manager has items of information.

In one configuration, the second manager carries out a change of values—presented to said manager—of attributes relating to the element, exclusively on the basis of a change—conveyed to said manager—of values presented to the first manager. Consequently, with its changes of values the second manager follows the changes which are presented to the first manager. In the case where changes in the values are not known to the first manager and the latter does not convey them to the second manager, the second manager does not carry out any change in its values.

Preferably, the first and the second manager are parts of mutually different network management systems. Thus, the first manager can be for example a manager of a mobile radio communication system of a first operator, while the second manager is a manager of a mobile radio communication systems of a second operator, and the two mobile radio communication systems have overlapping radio coverage areas. Alternatively, the first manager can be for example a manager of a first manufacturer in a mobile radio communication system, while the second manager is a manager of a second manufacturer in the same mobile radio communication system.

In accordance with one preferred configuration of the proposed method, the element is a radio cell of a mobile radio communication system.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 shows an excerpt from two network management systems.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

FIG. 1 shows an excerpt from a first network management system NET 1, comprising the manager EM 1, and from a second network management system NET 2, comprising the manager EM 2. Although the method can be applied to any network management systems, it is assumed hereinafter that the two network management systems NET 1 and NET 2 are responsible for managing a mobile radio communication system. Further parts of the network management systems NET 1 and NET 2, thus e.g. elements managed by the managers EM 1 and EM 2, and managers superordinate to the managers EM 1 and EM 2, are not illustrated in FIG. 1 for the sake of clarity.

Elements of the mobile radio communication systems are modeled in the network management systems as objects which are allocated to a respective object class. Each object class is defined by specific operations, that is to say by commands which can be sent to objects in this object class by a manager, and by specific attributes, that is to say properties which can be interrogated and, if appropriate, processed by a manager, and by specific messages which can be sent by objects in the respective object class in the context of the network management, and by the description of the meaning and of the behavior of the object class and its parts. In this case, each attribute can be assigned a value from a plurality of values that are possible for the respective attribute.

The manager EM 1 manages an element OB, which is known to the manager EM 1 as object MA-OB. Although said element OB is not managed by the manager EM 2, it is known to the manager EM 2 as an external object EX-OB. The items of information which are presented to the manager EM 2 about the element OB are a copy of the items of information of the manager EM 1 or a copy of a subset of the items of information of the manager EM 1. The object MA-OB is therefore the master object, and the object EX-OB is the associated external object or proxy object. The object classes with which the objects MA-OB and EX-OB are associated can differ. The generation or instantiation of the object MA-OB in the manager EM 1 and of the object EX-OB in the manager EM 2 is performed by a device PLAN. The device PLAN preferably corresponds to an apparatus used for network planning purposes. In this case, it is possible either for the object MA-OB to be generated first, or for the object EX-OB to be generated first, or else for the two objects MA-OB and EX-OB to be generated simultaneously.

The method can be applied to different types of elements; however, it is assumed hereinafter that the element OB under consideration is a radio cell. Said radio cell OB is part of the mobile radio communication system monitored by the network management system NET 1. For the network management system NET 2 it is of interest to know data of the radio cell OB, in order e.g. to be able to take handover decisions from a radio cell managed by the network management system NET 2 to the radio cell OB.

In the case of UMTS mobile radio communication systems, the object classes ExternalUtranCell for the external cell and Utran cell for the cell associated with the system exist in accordance with the standard 3GPP TS 32.642.

The object class ExternalUtranCell has the following attributes:
  mcc: Mobile Country Code; this variable is part of the PLMN Id in accordance with 3GPP TS 23.003.
  mnc: Mobile Network Code; this variable is part of the PLMN Id in accordance with 3GPP TS 23.003.
  rncId: Unique RNC ID in accordance with 3GPP TS 23.003.
  cID: Cell identification information for a specific RNC in accordance with 3GPP TS 25.401 and 3GPP TS 25.433.
The object class UtranCell has the following attribute:
  cID: Cell identification information for a specific RNC in accordance with 3GPP TS 25.401 and 3GPP TS 25.433.
The attributes
  mcc: Mobile Country Code; this variable is part of the PLMN Id in accordance with 3GPP TS 23.003.
  mnc: Mobile Network Code; this variable is part of the PLMN Id in accordance with 3GPP TS 23.003.
  rncId: unique RNC ID in accordance with 3GPP TS 23.003.
belong to the object class RncFunction comprising the object class UtranCell (containment); consequently, these attributes also relate to the objects of the object class UtranCell.

Since the network management system NET 1 monitors the element OB, it can arrange a change in the attributes relating to the object MA-OB. This means that the values— stored by the manager EM 1—of the attributes relating to the object MA-OB can change with time. Since the manager EM 2 in this case no longer knows the actual values of the attributes relating to the element OB, an information alignment or a synchronization of the two data records MA-OB and EX-OB is effected from time to time. The device PLAN is not used for said alignment, rather the two managers EM 1 and EM 2 communicate directly with one another, symbolized in FIG. 1 by a double-headed arrow designated by P2P (Peer to Peer).

The information alignment relating to the values of the attributes relating to the element OB between the managers EM 1 and EM 2 is effected by the manager EM 2 interrogating said values with reference to an identification information item of the element OB and receiving as a reply the current values relating to the element OB which are stored by the manager EM 1. The identification information used should be a variable which is not changed. For this reason, the so-called full distinguished name, for example, cannot be used. This is because the latter is dependent on the position of the respective element in the object tree, the so-called containment tree. If the position of the element OB is changed in the network management system NET 1, this brings about a change in the full distinguished name of the element OB. If the manager EM 2 used the full distinguished name as identification information during the interrogation of the attribute values relating to the element OB, the element OB would no longer be found by the manager EM 1 after a change in the full distinguished name, such that a synchronization would be impossible.

It is desirable for the invariable identification information, sometimes referred to as persistent ID, not to be generated by the device PLAN which generates the objects MA-OB and EX-OB. Therefore, the managers EM 1 and EM 2 each generate an identification information item for synchronization purposes. For this generation, the managers EM 1 and EM 2 use the values of the attributes relating to the element OB which correspond to the original configuration, that is to say the configuration at the time of the generation of the objects MA-OB and EX-OB. This first configuration is the same for both managers EM 1 and EM 2. Furthermore, the two managers EM 1 and EM 2 use the same algorithm for determining the identification information.

One example of a method for determining the identification information from the original configuration is the use of a combination of values of the attributes per se as identification information. Such a combination might read: (attribute 1=value x AND attribute 2=value y AND attribute 3=value z). All or a subset of the attributes relating to the element OB can be used in this case. Both the manager EM 1 and the manager EM 2 store this specific combination, e.g. in the form of a further attribute. The manager EM 1 continues to store this combination even if attribute values relating to the element OB are changed. This last is advantageous since, in the case where the object MA-OB is generated before the object EX-OB, or in the case where some time elapses between the generation of the object MA-OB and the first synchronization interrogation by the manager EM 2, the situation can occur in which, during the first interrogation by the manager EM 2, the original configuration is no longer presented to the manager EM 1 on account of a change in a value of an attribute relating to the element OB. During an interrogation by the manager EM 2 using such an identification information item, it is then necessary to check, in the case of the configuration stored by the manager EM 1 as identification information, for each attribute whether there is correspondence with the configuration mentioned by the manager EM 2 as identification information.

A further example for determining the identification information is linking together the values of all or some of the attributes relating to the element OB in a specific order, with the result that the identification information produces e.g. a chain such as: (original value of the attribute 1, original value of the attribute 2, original value of the attribute 3). If appropriate, a variable calculated from the original value, e.g. a multiple, can be used instead of the original value of an attribute.

It is particularly advantageous to calculate a single variable from the values of all or some attributes of the original configuration, which is determined and stored by the manager EM 1 and EM 2. The use of a hash function such as MD5 is appropriate in this case. When a single variable is used as identification information, in contrast to the examples mentioned above, it is not necessary to consider or check a plurality of attribute values per object for identifying the element during a synchronization inquiry. Rather, the identification information that is sent by the manager EM 2 and comprises an individual variable merely has to be compared with the individual variables stored as identification information for the various objects by the manager EM 1.

Since the managers EM 1 and EM 2 take as a basis the same data record and the same calculation specification for determining the identification information, the identification information determined by the two managers EM 1 and EM 2 is the same. The same data record is present in particular even when mutually corresponding attributes are designated differently by the different managers EM 1 and EM 2 or are arranged differently in the object tree. Consequently, the manager EM 2 can refer to this identification information during an inquiry for the current values for the attributes relating to the element OB.

As an alternative to the case outlined heretofore in which the initial configuration of the objects MA-OB and EX-OB is in each case used by both managers EM 1 and EM 2 for the calculation of the identification information, it is also possible for the object EX-OB to be generated at a later point in time only after the manager EM 1 has already carried out changes of attributes relating to the element OB. In this case, the initial configuration is used by the manager EM 2 as a calculation basis for the identification information, and the manager EM 1 uses the configuration presented to it at the time of the generation of the object EX-OB.

The identification information determined by the two managers EM 1 and EM 2 is used in any event for the first interrogation of the attribute values relating to the element OB by the manager EM 2. This is because no other identification information for the element OB is available for this interrogation, since such information was not allocated by the device PLAN when generating the objects MA-OB and EX-OB. The identification information of the element OB that is determined by the two managers EM 1 and EM 2 can also be used for further interrogations of the manager EM 2 at the manager EM 1. As an alternative, however, it is possible for the manager EM 1 to generate a different identification information item for the element OB, e.g. the UUID (Universal Unique Identifier) specified by IETF. The manager EM 1 conveys this to the manager EM 2 during the first or a later interrogation of the attribute values relating to the element OB. Subsequently, the manager EM 2, during its interrogations relating to the element OB, can then refer to the new identification information generated by the manager EM 1.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for the operation of at least two network management systems, comprising:

presenting values of attributes relating to an element to a first network management device that is provided for managing elements in a first network management system;

presenting a copy of the values of attributes relating to the element to a second network management device that is provided for managing elements in a second network management system, the elements in the first and second network management systems supporting communications between at least two terminal devices via a telecommunications network;

generating, by each of the first network management device and the second network management device, an identification information item according to an original configuration of the element using at least some of the values of attributes relating to the element, the identification information item generated by the first network management device and the identification information item generated by the second network management device being the same;

storing, by the first network management device and the second network management device, the respective identification information items, the information items being stored independently of a change in values of attributes relating to the element;

conveying, to the second network management device, the change of values, presented to the first network management device, of the attributes relating to the element using the identification information items during a communication between the first network management device and the second network management device; and changing, by the second network management device, the values, presented to the second network management device, of the attributes relating to the element, exclusively based on the change of values conveyed to the second network management device by the communication between the first and second network management devices.

2. The method as claimed in claim 1, wherein the identification information items generated each comprise a single variable.

3. The method as claimed in claim 2, wherein a combination of values of attributes is generated as identification information items.

4. The method as claimed in claim 3, wherein the identification information items are generated using a hash function.

5. The method as claimed in claim 4, wherein the communication between the first network management device and the second network management device involves a synchronization of values of attributes relating to the element.

6. The method as claimed in claim 5, wherein the first network management device determines further identification information items and conveys them to the second network management device in the context of the communication, and the further identification information items are used during a further communication between the first network management device and the second network management device for identifying the element.

7. The method as claimed in claim 6, wherein the first network management device functions as a manager with respect to the element, while the second network management device functions as a manager exclusively with respect to other elements.

8. The method as claimed in claim 7, wherein the first network management device and the second network management device are parts of mutually different network management systems.

9. The method as claimed in claim 8, wherein the element is a radio cell of a mobile radio communication system.

10. The method as claimed in claim 1, wherein a combination of values of attributes is generated as identification information items.

11. The method as claimed in claim 1, wherein the identification information items are generated using a hash function.

12. The method as claimed in claim 1, wherein the communication between the first network management device and the second network management device involves a synchronization of values of attributes relating to the element.

13. The method as claimed in claim 1, wherein
the first network management device determines further identification information items and conveys them to the second network management device in the context of the communication, and
the further identification information items are used during a further communication between the first network management device and the second network management device for identifying the element.

14. The method as claimed in claim 1, wherein the first network management device functions as a manager with respect to the element, while the second network management device functions as a manager exclusively with respect to other elements.

15. The method as claimed in claim 1, wherein the first network management device and the second network management device are parts of mutually different network management systems.

16. The method as claimed in claim 1, wherein the element is a radio cell of a mobile radio communication system.

17. A method for the operation of at least two network management systems, comprising:
presenting values of attributes relating to an element representing a resource of a telecommunications network to a first network management device that is provided for managing elements in a first network management system, the element being managed by the first network management device;
presenting a copy of the values of attributes relating to the element to a second network management device that is provided for managing elements in a second network management system, the elements in the first and second network management systems supporting communications between at least two terminal devices via the telecommunications network;
generating, by the first network management device and the second network management device, respective first and second identification information items according to an original configuration of the element using at least some of the values of attributes relating to the element, the first identification information item generated by the first network management device and the second identification information item generated by the second network management device being the same and the first identification information item and the second identification information item representing an identity of the element in the management systems;
storing, by the first network management device and the second network management device, the respective identification information items, the information items being stored independently of a change in values of attributes relating to the element;
using the identification information items during a communication between the first network management device and the second network management device to identify the element to enable the second network management device to interrogate the first network management device in respect of at least one attribute of the element;
conveying, to the second network management device, the change of values, presented to the first network management device, of the attributes relating to the element; and
changing, by the second network management device, the values, presented to the second network management device, of the attributes relating to the element, exclusively based on the change of values conveyed to the second network management device.

18. A network management device capable of managing elements in a network management system managing a telecommunications network providing communication between terminal devices, said network management device comprising:
a store to store values of attributes relating to an element managed by the network management device received by the network management device, the element representing a resource of the telecommunications network supporting communications between at least two of the terminal devices;
an identification information item generator to generate an internally generated identification information item according to an original configuration of the element using at least some of the values of attributes relating to the element, the internally generated identification information item representing an identity of the element in the management system;
a store to store the internally generated identification information item, the internally generated information item being stored independently of a change in values of attributes relating to the element;
an input to receive in a communication from an external management entity in another network management system an externally generated identification information item generated by the external management entity according to an original configuration of the element using at least some of the values of attributes relating to the element, the externally generated identification information element representing an identity of the element in the other management system and being the same as the internally generated identification information element;
an interrogation handler to use the internally generated identification information element and the externally generated identification information element to identify the element to enable the external management entity to interrogate the network management device in respect of at least one attribute of the element; and
a processor to change values, presented to the network management device, of attributes relating to the element exclusively based on the change, conveyed to the network management device, of values presented to the external management entity.

* * * * *